(12) United States Patent
Quan

(10) Patent No.: US 12,412,236 B2
(45) Date of Patent: Sep. 9, 2025

(54) IMAGE REGISTRATION METHOD, TERMINAL, AND COMPUTER STORAGE MEDIUM

(71) Applicant: GUANGDONG OPPO MOBILE TELECOMMUNICATIONS CORP., LTD., Dongguan (CN)

(72) Inventor: Wei Quan, Yokohama (JP)

(73) Assignee: GUANGDONG OPPO MOBILE TELECOMMUNICATIONS CORP. LTD., Dongguan (CN)

( * ) Notice: Subject to any disclaimer, the term of this patent is extended or adjusted under 35 U.S.C. 154(b) by 591 days.

(21) Appl. No.: 17/742,825

(22) Filed: May 12, 2022

(65) Prior Publication Data

US 2022/0270204 A1  Aug. 25, 2022

Related U.S. Application Data

(63) Continuation of application No. PCT/CN2019/118049, filed on Nov. 13, 2019.

(51) Int. Cl.
*G06T 3/14* (2024.01)
*G06T 3/4053* (2024.01)
*G06T 7/50* (2017.01)

(52) U.S. Cl.
CPC .............. *G06T 3/14* (2024.01); *G06T 3/4053* (2013.01); *G06T 7/50* (2017.01); *G06T 2207/20021* (2013.01)

(58) Field of Classification Search
None
See application file for complete search history.

(56) References Cited

U.S. PATENT DOCUMENTS

| 2008/0037845 | A1 | 2/2008 | Deuerling-zheng et al. |
| 2011/0091073 | A1* | 4/2011 | Iwasaki ................ G06T 7/215 |
| | | | 382/103 |
| 2014/0368912 | A1* | 12/2014 | Imada .................. G06T 7/223 |
| | | | 359/557 |

FOREIGN PATENT DOCUMENTS

| CN | 105574838 A | 5/2016 |
| CN | 107092875 * | 8/2017 |

(Continued)

OTHER PUBLICATIONS

Alexandropoulos et al., "A block-based clustering technique for real time object detection on a static background," 2004 2nd International IEEE Conference on 'Intelligent Systems'. Proceedings (IEEE Cat. No. 04EX791), Varna, Bulgaria, 2004, pp. 169-173 vol. 1, doi: 10.1109/IS.2004. 1344659 (Year: 2004).*

(Continued)

*Primary Examiner* — Michelle M Koeth
(74) *Attorney, Agent, or Firm* — Sheppard, Mullin, Richter & Hampton LLP

(57) ABSTRACT

An image registration method includes: obtaining a first image and a second image; dividing the first image into blocks to obtain image blocks of the first image; determining, based on a pixel value of each image block, a similar image block of the image block from the second image by invoking a predetermined image block similarity algorithm; calculating, based on position information of the image block and position information of the similar image block, a movement amount of the image block of the first image; performing a clustering on the first image based on a depth value of the first image, the movement amounts of the image blocks, and position information of the first image, to generate clustered image blocks; and moving, when the clustered image blocks satisfy a predetermined condition, (Continued)

the image blocks based on the movement amounts of the image blocks, to obtain a registered image.

17 Claims, 7 Drawing Sheets

(56) References Cited

FOREIGN PATENT DOCUMENTS

| | | | |
|---|---|---|---|
| CN | 107437257 | A | 12/2017 |
| CN | 108682025 | A | 10/2018 |
| CN | 109064504 | A | 12/2018 |
| CN | 106952266 | B | 4/2019 |
| CN | 110047093 | A | 7/2019 |
| KR | 20140081481 | A | 7/2014 |
| WO | 2007135659 | A2 | 11/2007 |
| WO | 2017067390 | A1 | 4/2017 |

OTHER PUBLICATIONS

Carlotto, "A cluster-based approach for detecting man-made objects and changes in imagery," in IEEE Transactions on Geoscience and Remote Sensing, vol. 43, No. 2, pp. 374-387, Feb. 2005, doi: 10.1109/TGRS.2004.841481. (Year: 2005).*

The First Office Action from corresponding Chinese Application No. 201980101531.0 dated Jul. 26, 2024.

Van Essen et al., "Hierarchical Block-based Image Registration for Computing Multiple Image Motions", 24th International Conference Image and Vision Computing New Zealand, 1-6, Dec. 31, 2009.

Hu, "Extraction Corresponding Feature and Image Synthesis of New Viewpoint", "China Doctoral Dissertation Full-text Database (Information Technology Series)", 1138-15, Apr. 15, 2005, English Abstract provided.

International Search Report and Written Opinion dated Aug. 5, 2020 in International Application No. PCT/CN2019/118049. English translation attached.

* cited by examiner

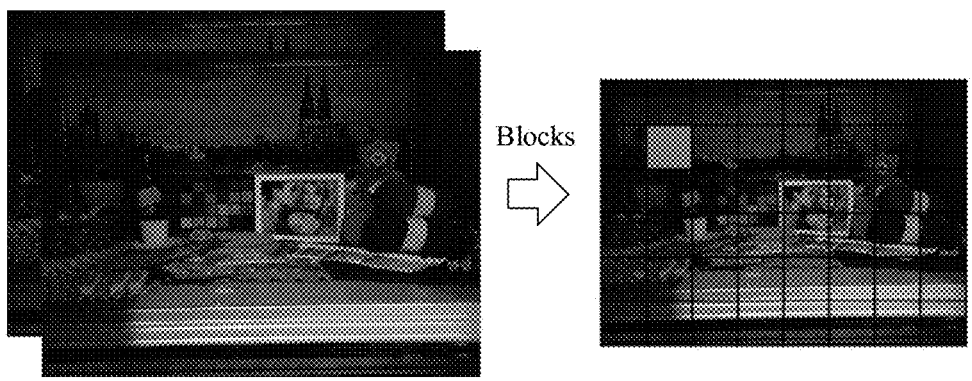
FIG. 4
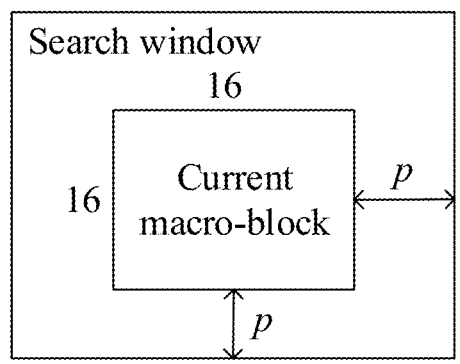
FIG. 5
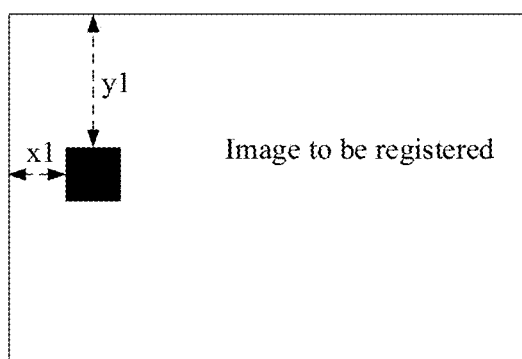 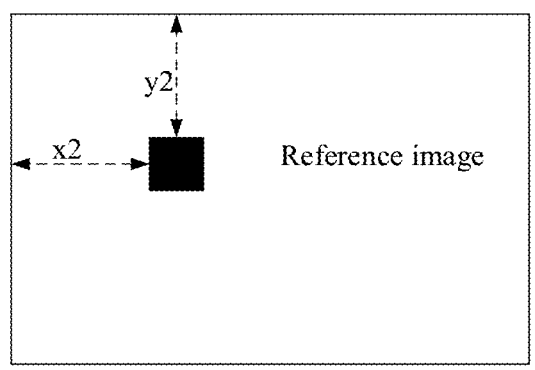
FIG. 6a  FIG. 6b

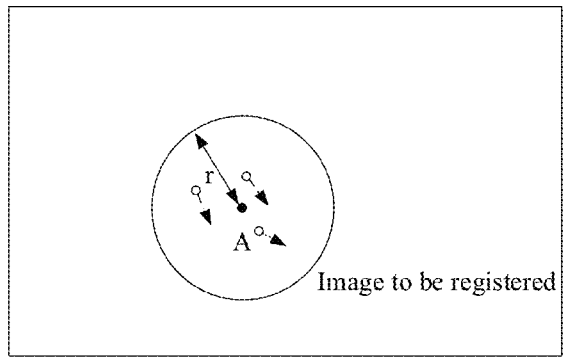
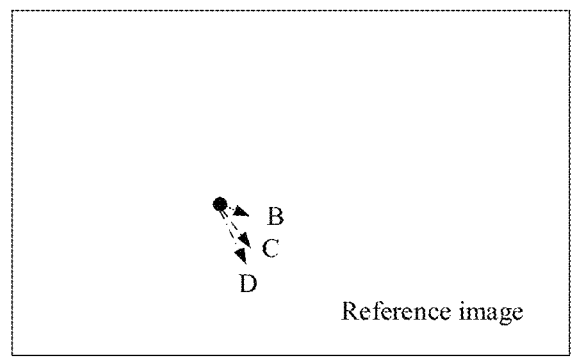
FIG. 7a
FIG. 7b
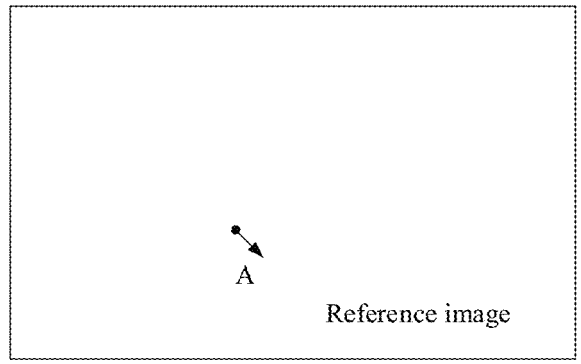
FIG. 7c
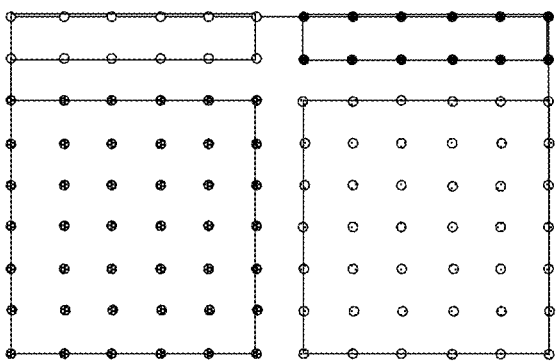
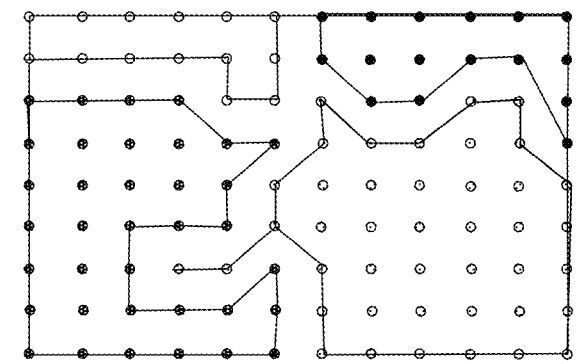
FIG. 8a
FIG. 8b

IMAGE REGISTRATION METHOD, TERMINAL, AND COMPUTER STORAGE MEDIUM

CROSS-REFERENCE TO RELATED APPLICATION

This application is a continuation of International Application No. PCT/CN2019/118049, filed on Nov. 13, 2019, the disclosure of which is hereby incorporated by reference in its entirety.

TECHNICAL FIELD

Embodiments of the present disclosure relate to image registration technologies, and more particularly, to an image registration method, a terminal, and a computer storage medium.

BACKGROUND

Image registration is a process of matching and superimposing two or more images obtained at different time, or obtained by different sensors, or acquired under different conditions, and it has been widely applied various fields such as remote sensing data analysis, computer vision, and image processing.

During the image registration, block matching, feature point-based matching, or an optical flow method are commonly employed to detect movements of pixels on an original image, and then the obtained movement amounts are used to move the pixels on the original image for generating a registered image.

Sparse movement amounts of pixels may be obtained by using the block matching and the feature point-based matching. For scenes including a moving object, the block matching and the feature point-based matching can only obtain a global motion model without taking into account the matching of a local moving object simultaneously, which may have a certain impact on the result of image registration. When the optical flow method is employed, an optical flow often cannot process edge information of an image with a sufficient accuracy, such that edges of a matched image may be blurred, thereby reducing accuracy of image registration. Accordingly, in view of the above, the existing image registration methods have low registration accuracy.

SUMMARY

Embodiments of the present disclosure provide an image registration method, a terminal, and a non-transitory computer storage medium.

In a first aspect, the embodiments of the present disclosure provide an image registration method. The method includes: obtaining image blocks of a first image by dividing the first image into blocks; determining, based on a pixel value of each of the image blocks of the first image, similar image blocks from a second image corresponding to the image blocks of the first image by invoking a predetermined image block similarity algorithm, each of the similar image blocks corresponding to one of the image blocks of the first image; obtaining, based on position information of the image block of the first image and position information of the corresponding similar image block, a movement amount of each of the image blocks of the first image; generating clustered image blocks by performing a clustering on the first image based on a depth value of the first image, the movement amounts of the image blocks of the first image, and position information of the first image; and obtaining a registered image by moving the image blocks of the first image based on the movement amounts of the image blocks of the first image.

In a second aspect, the embodiments of the present disclosure provide a terminal. The terminal includes: a processor; and a storage medium storing instructions executable by the processor. The storage medium is operative by means of the processor, via a communication bus, and the instructions, when executed by the processor, implement the image registration method according to the first aspect.

In a third aspect, the embodiments of the present disclosure provide a computer-readable storage medium having executable instructions stored thereon, where one or more processors, when executing the executable instructions, implement the image registration method according to the first aspect.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF DRAWINGS

FIG. 4 is a schematic diagram illustrating an optional division process of an image to be registered according to an embodiment of the present disclosure.

FIG. 5 is a schematic structural diagram illustrating an optional search on a reference image according to an embodiment of the present disclosure.

FIG. 6a is a schematic structural diagram of an optional image to be registered according to an embodiment of the present disclosure.

FIG. 6b is a schematic structural diagram of an optional reference image according to an embodiment of the present disclosure.

FIG. 7a is a schematic structural diagram of another optional image to be registered according to an embodiment of the present disclosure.

FIG. 7b is a schematic structural diagram illustrating another optional reference image according to an embodiment of the present disclosure.

FIG. 7c is a schematic structural diagram of yet another optional reference image according to an embodiment of the present disclosure.

FIG. 8a is a schematic structural diagram of optional image blocks of an image to be registered according to an embodiment of the present disclosure.

FIG. 8b is a schematic structural diagram of optional clustered image blocks according to an embodiment of the present disclosure.

DESCRIPTION OF EMBODIMENTS

The technical solutions according to the embodiments of the present disclosure will be described clearly and in detail below in combination with accompanying drawings of the embodiments of the present disclosure. It can be understood that the specific embodiments described herein are only used to explain, rather than limit, the present disclosure. In addition, it should be noted that, for the convenience of description, only parts related to the present disclosure are illustrated in the figures.

Figure 1:
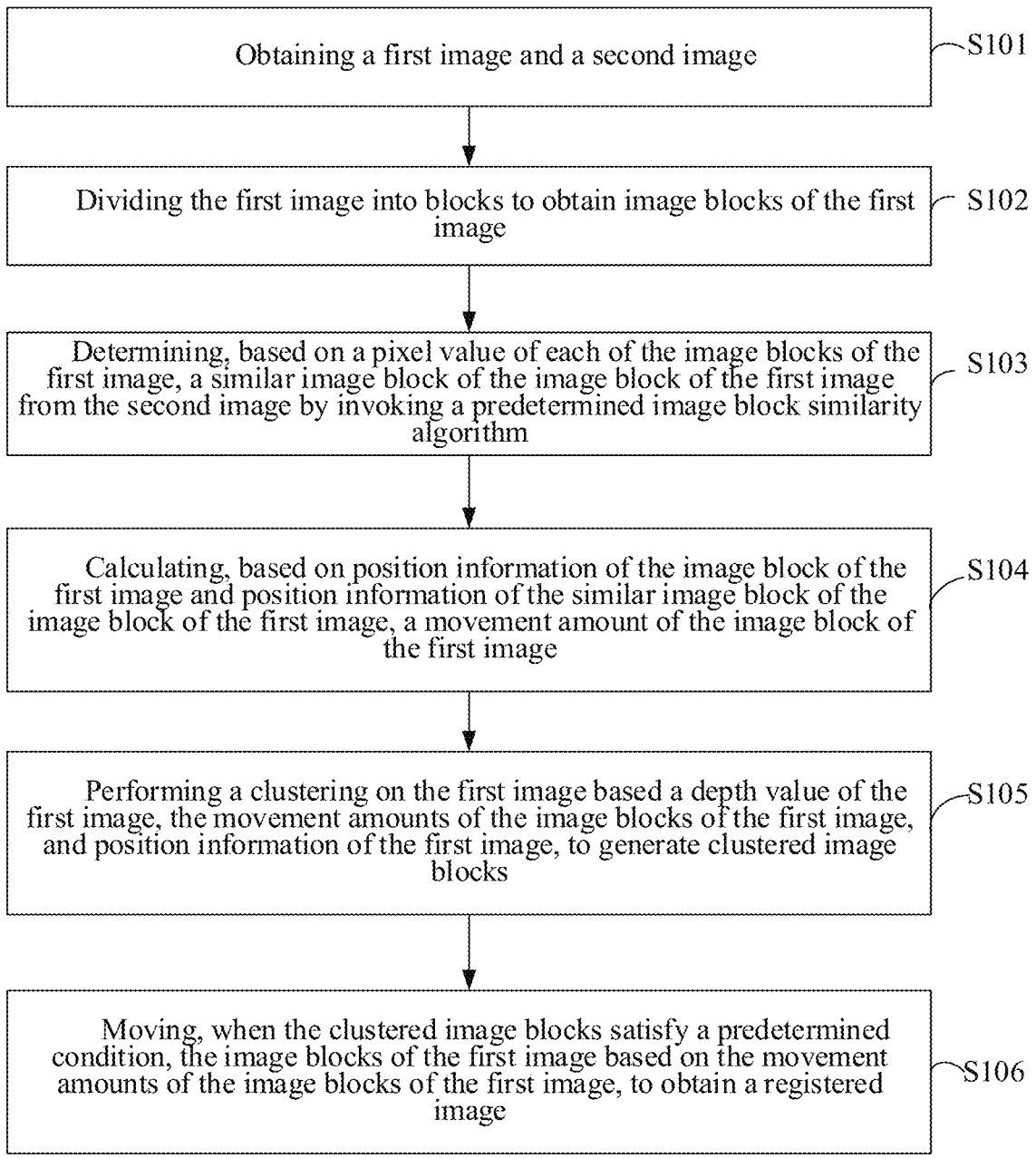
FIG. 1 is a flowchart of an optional image registration method according to an embodiment of the present disclosure.

The embodiments of the present disclosure provide an image registration method. FIG. 1 is a flowchart of an optional image registration method according to an embodiment of the present disclosure. As illustrated in FIG. 1, the image registration method may include the following action blocks.

At block S101, a first image and a second image are obtained.

Figure 2:
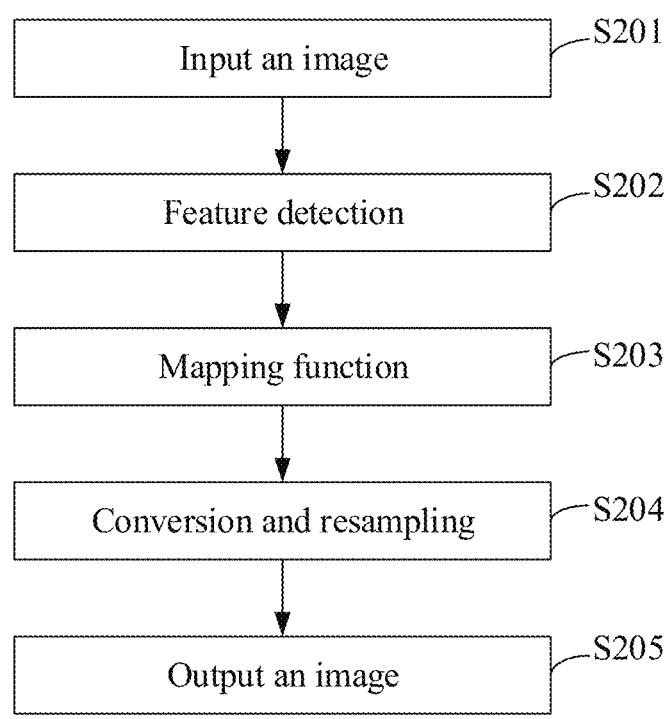
FIG. 2 is a flowchart of a feature point-based matching method.

At present, the block matching, the feature point-based matching, and the optical flow method are the common image registration methods. FIG. 2 is a flowchart of a feature point-based matching method. As illustrated in FIG. 2, the feature point-based matching method may include the following action blocks.

At block S201, an image is input.

Specifically, the obtained input image includes an image to be registered and a reference image.

At block S202, feature detection is performed.

Specifically, the feature detection is performed on both the image to be registered and the reference image, to obtain feature points of the image to be registered and feature points of the reference image.

At block S203, mapping function is applied.

Here, a mapping function is used to find feature points of the reference image that match feature points of the image to be registered.

At block S204, conversion and resampling are performed.

At block S205, an image is output.

Then, coordinate transformation parameters of an image space are obtained based on pairs of matched feature points, and finally image registration is performed based on the coordinate transformation parameters to obtain a registered image, i.e., an output image.

In this manner, the registered image is obtained through the feature point-based matching method.

In view of the above method, the feature point-based matching method can only obtain sparse movement amounts of pixels, similar as the block matching. Therefore, for the scene including a moving object, these two methods can only obtain a global motion model without taking into account a local moving object at the same time, which may result in low accuracy of an image registration result. When the optical flow method is employed, an optical flow often cannot process edge information with an insufficient image accuracy, such that edges of a matched image are blurred, thereby reducing accuracy of the obtained registered image.

In order to improve the accuracy of image registration, the image to be registered and the reference image are obtained first. At block S101, the obtained first image is the image to be registered, and the obtained second image is the reference image. Therefore, the first image and the second image are used for registration to obtain the registered image.

Here, it should be noted that, in addition to a pixel value and position information of the first image, the obtained first image further includes a depth value of the first image. Similarly, in addition to a pixel value and position information of the second image, the obtained second image further includes a depth value of the second image.

The pixel value of the first image and the pixel value of the second image may be color information of an image, e.g., Red, Green, Blue (RGB) information, or grayscale information, which are not specifically limited in the embodiments of the present disclosure.

At block S102, the first image is divided into blocks to obtain image blocks of the first image.

After the first image and the second image are obtained at S101, the first image is required to be divided into blocks. The first image can be divided into normal rectangular blocks. For example, the first image can be divided into several blocks based on a given size, to obtain image blocks of the first image.

At block S103, a similar image block of the image block of the first image is determined, based on a pixel value of each of the image blocks of the first image, from the second image by invoking a predetermined image block similarity algorithm.

After the image blocks of the first image are obtained at S102, for each image block of the first image, traversal search is performed, by taking a size of each image block of the first image as a reference block, on the second image to obtain each image block traversed by the search, a similarity between the reference block and the image block traversed by the search is calculated, and an image block having a maximum similarity value is determined as the similar image block of the first image. For the calculation of the similarity, the Sum of Abstract Difference (SAD) method, or the Normalized Cross Correlation (NCC) method can be adopted. The embodiments of the present disclosure are not limited to any of these examples.

It should be noted that, when grayscale information of the first image is quite different from grayscale information of the second image, the NCC method is often used to calculate a similarity between two image blocks.

In this manner, through block S103, the similar image blocks can be searched for in the second image for the image blocks of the first image.

At block S104, a movement amount of the image block of the first image is calculated based on position information of the image block of the first image and position information of the similar image block of the image block of the first image.

After the similar image block of the image block of the first image are determined, the movement amount of the image block of the first image can be calculated based on the position information of the image block of the first image and the position information of the similar image block of the image block of the first image.

In order to obtain the movement amount of the image block of the first image, in an alternative embodiment, block S104 may include: determining, as an initial movement amount of a pixel in the image block of the first image, a difference value between horizontal-vertical coordinates of the image block of the first image and horizontal-vertical coordinates of the similar image block of the image block of the first image; and correcting the initial movement amount of the pixel in the image block of the first image to obtain the movement amount of the image block of the first image.

Specifically, for the first image and the second image, a lower left image corner can be determined as an origin of two-dimensional coordinates, and a distance between a length of an image block and a horizontal coordinate axis as well as a distance between a width of the image block and a vertical coordinate axis can be recorded as position information of the image block. In this case, it is assumed that horizontal-vertical coordinates in the position information of the image block of the first image are (x1, y1), and horizontal-vertical coordinates in the position information of the similar image block of the image block of the first image are (x2, y2), then a difference value between (x1, y1) and (x2, y2) is calculated as (x1−x2, y1−y2), which is recorded as an initial movement amount of a pixel in the image block of the first image. It should be noted that, the image block of the first image includes several pixels, and the pixels in a same image block have the same initial movement amount, i.e., having the same difference value between the horizontal-vertical coordinates of the image block of the first image and the horizontal-vertical coordinates of the similar image block of the image block of the first image.

Subsequent to the calculation of the initial movement amount of the pixel in the image block of the first image, it is required to further correct the initial movement amount, so as to obtain the movement amount of the image block of the first image. Then, to obtain the movement amount of the image block of the first image, in an alternative embodiment, said correcting the initial movement amount of the pixel in the image block of the first image to obtain the movement amount of the image block of the first image includes: sampling a predetermined number of pixels from a predetermined range of the first image by taking position information of any selected pixel in the image block of the first image as a reference; moving, based on the initial movement amount of the predetermined number of pixels, the position information of the selected pixel to generate a moved pixel; obtaining, in the second image, a pixel value of a pixel at a same position as the moved pixel; determining a weight of the moved pixel based on the pixel value of the pixel at the same position as the moved pixel; and performing a weighted summation on an initial movement amount of the moved pixel based on the weight of the moved pixel, to obtain the movement amount of the image block of the first image.

Specifically, a pixel is selected from the image block of the first image, and by taking the horizontal-vertical coordinates of the selected pixel as references, within a predetermined range of the selected pixel (for example, within a range which takes the selected pixel as a center), pixels in an image block, which is adjacent to the image block where the selected pixel is located, are sampled. In order to obtain various types of sampled data, different adjacent image blocks are usually selected and respectively sampled, such that a predetermined number of pixels can be obtained.

After the predetermined number of pixels is sampled, the initial movement amount of the predetermined number of pixels can be obtained. In this case, the position information of the selected pixel is moved based on the movement amount of the predetermined number of pixels, so as to generate a moved pixel.

For the moved pixel, the weight of the moved pixel can be determined based on the pixel value of the pixel at the same position as the moved pixel. That is, each moved pixel corresponds to a weight value. Therefore, based on the weight of the moved pixel, the weighted summation can be performed on the initial movement amount of the moved pixel, and a value obtained through the weighted summation is determined as the movement amount of the image block of the first image.

To determine the weight value of the moved pixel, in an alternative embodiment, said determining the weight of the moved pixel based on the pixel value of the moved pixel includes: obtaining an absolute difference between the pixel value of the pixel at the same position as the moved pixel and a pixel value of the selected pixel; and determining, as the weight of the moved pixel, a weight corresponding to the absolute difference between the pixel value of the pixel at the same position as the moved pixel and the pixel value of the selected pixel.

Specifically, after the moved pixel is obtained, the pixel value of a pixel at the same position as each moved pixel in the second image is obtained, and the absolute difference between the pixel value of the pixel at the same position as the moved pixel and the pixel value of the selected pixel is obtained. Since the absolute difference between the pixel value of the pixel at the same position as the moved pixel and the pixel value of the selected pixel corresponds to the weight value, the corresponding weight value can be determined as the weight value of the moved pixel.

The weight value corresponding to the absolute difference between the pixel value of the pixel at the same position as the moved pixel and the pixel value of the selected pixel can be set in advance or input in real time. The embodiments of the present disclosure are not limited in this regard.

At block S105, a clustering is performed on the first image based on a depth value of the first image, the movement amounts of the image blocks of the first image, and position information of the first image, to generate clustered image blocks.

After the movement amount of the image block of the first image is obtained at block S104, it is determined whether the movement amount of the image block of the first image is available. Here, in order to determine whether the movement amount is available, a clustering is performed on the first image, and then based on the clustered image blocks, it is determined whether the movement amount of the image block of the first image is available.

In addition, when a resolution of a pixel value of the first image is different from a resolution of the depth value of the first image, the resolution of the depth value of the first image is required to be processed. In an alternative embodiment, the method may further include, prior to block S105: increasing, based on the resolution of the pixel value of the first image, the resolution of the depth value of the first image, to obtain a processed depth value of the first image.

Correspondingly, the block S105 may include: performing a clustering on the first image based on the processed depth value of the first image, the movement amounts of the image blocks of the first image, and the position information of the first image, to generate the clustered image blocks.

That is, when the resolution of the depth value of the first image is smaller than the resolution of the pixel value of the first image, the depth value of the first image is increased to enable the resolution of the increased depth value of the first image to be equal to the resolution of the pixel value of the first image; and when the resolution of the depth value of the first image is greater than the resolution of the pixel value of the first image, the depth value of the first image is reduced to enable the resolution of the reduced depth value of the first image to be equal to the resolution of the pixel value of the first image. In this way, the resolution of the processed depth value of the first image can be equal to the resolution of the pixel value of the first image.

In this manner, after the processed depth value of the first image is obtained, the first image needs to be clustered based on the processed depth value of the first image, the movement amounts of the image blocks of the first image, and the position information of the first image, to generate the clustered image blocks.

It should be noted that when the depth value is reduced or increased, the depth value of the first image can also be preprocessed and corrected. For the first image having the depth value represented by a bitmap, surface information of an object can be reconstructed through triangular plane reconstruction, and smoothing and interpolation processing can be performed. For the first image having the depth value represented by a depth map, it is necessary to detect dead pixels in the first image and de-noising to ensure a high accuracy of the obtained depth value.

In order to obtain the clustered image blocks, in an alternative embodiment, the block S105 may include: determining the movement amount of the image block of the first image as a movement amount of a pixel in the image block of the first image; multiplying each of depth values corresponding to pixels in the first image, the movement amounts of the pixels in the first image, and position information of the pixels in the first image by a corresponding weight, to form arrays of the first image; and clustering the arrays of the first image based on a predetermined clustering algorithm to generate the clustered image blocks.

First, the obtained movement amount of the image block of the first image is a movement amount of a pixel in the image block of the first image. For each pixel in the first image, each of a depth value corresponding to the pixel, a movement amount of the pixel, and a position coordinate of the pixel is multiplied by a weight value corresponding to the pixel, to form an array, i.e., an array of the first image.

The arrays of the first image are clustered by using a predetermined clustering algorithm. The predetermined clustering algorithm may be a mean-shift clustering algorithm, or a K-means clustering algorithm, which is not limited in the embodiments of the present disclosure.

In this manner, the clustered image blocks can be generated.

Further, in order to obtain the clustered image blocks, in an alternative embodiment, said clustering the arrays of the first image based on the predetermined clustering algorithm to generate the clustered image blocks includes: clustering the arrays of the first image based on the predetermined clustering algorithm to obtain initial clustered image blocks; selecting, from the initial clustered image blocks, an image block having a number of pixels smaller than a first predetermined threshold; and re-categorizing the selected image block to obtain the clustered image blocks.

After said clustering is performed by using the predetermined clustering algorithm, the initial clustered image blocks can be obtained. The initial clustered image blocks may include an image block having a small of pixels, which has no reference significance and thus a category thereof shall be discarded to perform a re-categorizing.

Specifically, the first predetermined threshold is determined in advance, and the image block having a number of pixels smaller than the first predetermined threshold is selected from the initial clustered image blocks, a category of the image block is discarded, and a re-categorizing is performed.

In order to re-categorize the category of the image block having the number of pixels smaller than the first predetermined threshold, in an alternative embodiment, said re-categorizing the selected image block to obtain the clustered image blocks includes: determining, from the initial clustered image blocks, an image block having a minimum distance to the selected image block; and categorizing the selected image block to a category of the image block having the minimum distance to the selected image, to obtain the clustered image blocks.

It should be noted that, among the clustered image blocks, different categories of image blocks have a certain distance therebetween. The selected image block is categorized to the image block closest to the selected image block. In this manner, the category having the minimum number of pixels is discarded to obtain the clustered image blocks.

At block S106, when the clustered image blocks satisfy a predetermined condition, the image blocks of the first image are moved based on the movement amounts of the image blocks of the first image, to obtain a registered image.

For the clustered image blocks, it is required to determine whether the clustered image blocks satisfy the predetermined condition. Only when the clustered image blocks satisfy the predetermined condition, the accuracy of the calculated movement amounts of the image blocks of the first image satisfies a requirement, and thus the image blocks of the first image are moved based on the movement amounts of the image blocks of the first image to obtain a final registered image.

In a case where the clustered image blocks do not satisfy the predetermined condition, in an alternative embodiment, the image registration method may further include: determining, when the clustered image blocks fail to satisfy the predetermined condition, the clustered image blocks as image blocks of the first image to be updated; and returning to implement said determining, based on the pixel value of each of the image blocks of the first image, the similar image block of the image block of the first image from the second image by invoking the predetermined image block similarity algorithm.

That is, when the clustered image blocks fail to satisfy the predetermined condition, it indicates that the calculated movement amounts of the image blocks of the first image have insufficient accuracy, and the movement amounts of the image blocks of the first image are required to be recalculated. In this case, the clustered image blocks are determined as the image blocks of the first image. Therefore, a block division manner of the first image is updated, and then blocks S103 to S106 are executed until the clustered image blocks that are obtained satisfy the predetermined condition, thereby obtaining the registered image with higher accuracy.

For the above-mentioned predetermined condition, in an alternative embodiment, the clustered image blocks satisfying the predetermined condition is determined by: determining image blocks of the first image corresponding to the clustered image blocks in one-to-one correspondence, comparing each of the clustered image blocks with a corresponding one of the image blocks of the first image, and determining a number of changed pixels in the clustered image blocks; and determining, when a ratio of the number of the changed pixels to a size of the first image is smaller than a second predetermined threshold, that the clustered image blocks satisfy the predetermined condition.

In an alternative embodiment, the clustered image blocks failing to satisfy the predetermined condition is determined by: determining, when the ratio of the number of the changed pixels to the size of the first image is equal to or greater than the second predetermined threshold, that the clustered image blocks fail to satisfy the predetermined condition.

Specifically, one-to-one correspondence is established between the clustered image blocks and the image blocks of the first image. More specifically, for a clustered first image block, an image block having a smallest number of changed pixels compared with the first image block is searched for among the image blocks of the first image, and a correspondence is established between the image block having the smallest number of changed pixels and the first image block. Then, for a second image block, an image block having a smallest number of changed pixels compared with the second image block is searched for among the remaining image blocks of the first image, and a correspondence is established between the image block having the smallest number of changed pixels and the second image block, . . . , and so on in a similar fashion, until all the image blocks of the first image corresponding to the clustered image blocks in one-to-one correspondence are determined. Thereafter, a number of changed pixels in each clustered image block is obtained through comparison. For example, for one clustered image block in the clustered image blocks, an image block corresponding to the one clustered image block is searched for among the image blocks of the first image, then, disappeared pixels and newly-added pixels, i.e., changed pixels, in the one clustered image block are determined, so as to obtained the number of changed pixels.

Then, the ratio of the number of the changed pixels to the size of the first image is calculated, so as to determine a relation between the ratio and a second predetermined threshold through comparison. Only when the ratio is smaller than the second predetermined threshold, it can determine that the clustered image blocks satisfy the predetermined condition, and thus the first image can be moved based on the calculated movement amounts of the image blocks of the first image, for obtaining the registered image. Otherwise, it is determined that the clustered image blocks do not satisfy the predetermined condition, and a block division manner is updated by updating image blocks of the first image with the clustered image blocks. In this way, the movement amounts of the image blocks of the first image are re-determined, until the clustered image blocks satisfy the predetermined condition, thereby obtaining a more accurate registered image.

After the registered image is obtained, an overlapping pixel and a vacant pixel may exist. In an alternative embodiment, subsequent to block S106, the method may further include: when there is an overlapping pixel in the registered image, selecting, from pixel values of the first image, one pixel value corresponding to the overlapping pixel, and determining the selected pixel value as a pixel value of the overlapping pixel.

Since some pixels may be moved to the same position after the first image is moved, the overlapping pixel may exist in the registered image, and the overlapping pixel in the registered image includes more than one pixel value. In order to determine a pixel value of the overlapping pixel, one pixel value can be arbitrarily selected from the pixel values of the first image that correspond the overlapping pixel as the pixel value of the overlapping pixel, or from the pixel values of the first image that correspond the overlapping pixel, one pixel value can be selected as the pixel value of the overlapping pixel based on a predetermined method. Of course, the pixel value of the overlapping pixel can also be calculated by using a certain predetermined algorithm. The embodiments of the present disclosure are not limited to any of these examples.

To determine the pixel value of the overlapping pixel, in an alternative embodiment, said selecting, from the pixel values of the first image, the one pixel value corresponding to the overlapping pixel, and determining the selected pixel value as the pixel value of the overlapping pixel includes: obtaining at least two pixel values corresponding to the overlapping pixel; determining differences between the at least two pixel values and a pixel value of the second image corresponding to the overlapping pixel; and determining the pixel value of the overlapping pixel based on a relation of absolute values of the differences between the at least two pixel values and the pixel value of the second image corresponding to the overlapping pixel.

Specifically, at least two pixel values corresponding to the overlapping pixel are obtained, then a difference between each two pixel value and the pixel value of the second image corresponding to the overlapping pixel as well as an absolute value of the difference are calculated, and the pixel value of the overlapping pixel is determined based on the relation of the absolute values of the differences between the at least two pixel values and the pixel value of the second image corresponding to the overlapping pixel. For example, a pixel value having a smaller absolute value is determined as an overlapping pixel value.

For the vacant pixel, in an alternative embodiment, subsequent to block S106, the method may further include: when there is a vacant pixel in the registered image, determining, based on a pixel value of an adjacent pixel of the vacant pixel, a pixel value of the vacant pixel by adopting a predetermined algorithm. The vacant pixel is a pixel having no pixel value.

When the vacant pixel appears in the registered image, i.e., when the registered image includes a pixel having no pixel value, an adjacent pixel of the vacant pixel can be obtained, and then the pixel value of the vacant pixel can be calculated based on a predetermined interpolation algorithm or a global motion model, thereby obtaining a more accurate and complete registered image.

The image registration method described in the above one or more embodiments will be explained below with examples.

Figure 3:
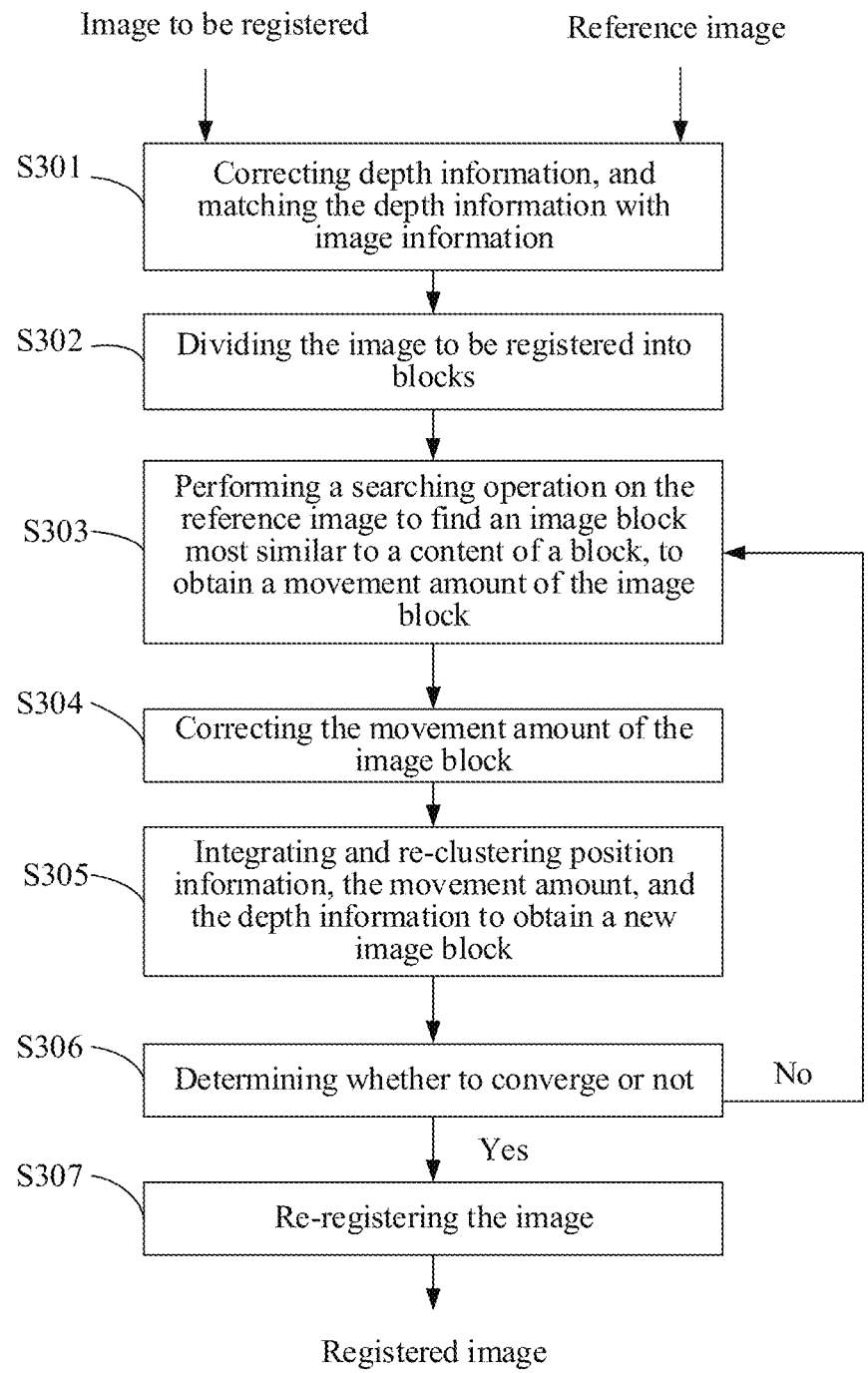
FIG. 3 is a flowchart illustrating an example of an optional image registration method according to an embodiment of the present disclosure.

FIG. 3 is a flowchart illustrating an example of an optional image registration method according to an embodiment of the present disclosure. As illustrated in FIG. 3, the image registration method may include the following action blocks.

At block S301, depth information is corrected, and the depth information is matched with image information.

Specifically, two or more images (videos) and depth maps (depth information, equivalent to the above-mentioned depth values) are captured by a camera device of a terminal. In this case, when two images are registered, one image is used as an image to be registered, and the other one is used as a reference image. An image obtained after the registration is a registered image.

After the image to be registered and the reference image are obtained, image information and depth information of the image to be registered can be obtained, and the image information may be RGB values or grayscale information. Herein, the grayscale information is taken as an example.

Since the depth information may be a bitmap or a depth map, the depth information is required to be preprocessed and corrected. When the depth information is a bitmap, it is necessary to reconstruct surface information of an object through triangular plane reconstruction, and perform smoothing and interpolation processing. When the depth information is a depth image, it is necessary to detect dead pixels and de-noise, in order to ensure a higher accuracy of the obtained depth information.

After the depth information is corrected, the depth map shall be matched with the grayscale information. Since the depth information often does not have a high resolution as the grayscale information, the depth information needs to be up-sampled before a matching processing. The depth information and the grayscale information are required to be calibrated to guarantee an accuracy of the matching. During the up-sampling, edge accuracy can be guaranteed by means of, e.g., guided filtering. After the matching is completed, depth information of each pixel in the image can be obtained.

At block S302, an image to be registered is divided into blocks.

After the depth information of each pixel is obtained, the image to be registered is divided into blocks. In the 1-st division, the image to be registered may be divided into normal rectangular blocks, in which an appropriate image block size may be given, and the image blocks may be evenly distributed over the entire image. A size of the image blocks is not fixed when an algorithm is in progress. FIG. 4 is a schematic diagram illustrating an optional division process of an image to be registered according to an embodiment of the present disclosure. As illustrated in FIG. 4, after the image to be registered and the reference image are obtained, the image to be registered is divided into blocks. In this case, T\the image to be registered is divided into blocks with a fixed size, to obtain the image blocks of the image to be registered. The image, to which an arrow in FIG. 4 points, is the image to be registered with divided image blocks. As illustrated, the image to be registered is divided into multiple rectangular blocks.

At block S303, a searching is performed on a reference image to find an image block most similar to a content of a block, to obtain a movement amount of the image block.

The image blocks on the image to be registered are selected one by one, and the searching is performed by moving image blocks on the reference image, which are located at same positions and having the same sizes as respective image blocks on the image to be registered. FIG. 5 is a schematic structural diagram illustrating an optional search on a reference image according to an embodiment of the present disclosure. As illustrated in FIG. 5, a current macro-block is searched within a search window. That is, the input reference image is searched within the search window until an image block most similar to a content of an image block to be registered is found. Similarity between image blocks can be evaluated by the SAD method. When the overall grayscale information of the image to be registered is quite different from the overall grayscale information of the reference image, an NCC index can also be used to evaluate similarity between image blocks.

In addition, after the search is completed, a position difference between an image block of the image to be registered and a reference image block similar to the image block of the image to be registered is determined as a movement amount of the image block to be registered. FIG. 6a is a schematic structural diagram of an optional image to be registered according to an embodiment of the present disclosure. FIG. 6b is a schematic structural diagram of an optional reference image according to an embodiment of the present disclosure. As illustrated in FIG. 6a and FIG. 6b, for one image block in the image to be registered in FIG. 6a, position coordinates of the image block are (x1, y1), a position of a similar image block (in the reference image) similar to this image block is as illustrated in FIG. 6b, and position coordinates of the position are (x2, y2). Therefore, a movement amount mv of the image block can be expressed as:

$$mv=[x1-x2, y1-y2] \qquad (1)$$

Since image blocks do not overlap each other, the movement amount can be used as the movement amount of all the pixels in the image block, so as to obtain the movement amounts of all pixels in the image to be registered.

At block S304, the movement amount of the image block is corrected.

Due to a low granularity of a block search method, the movement amounts of pixels obtained by such a method are of low accuracy, and thus correction and refinement need to be performed on the movement amounts of all the pixels.

FIG. 7a is a schematic structural diagram of another optional image to be registered according to an embodiment of the present disclosure. As illustrated in FIG. 7a, a position P and a pixel value BV of a certain pixel A are obtained. For pixels within a range having a radius r and a center of the pixel A, the movement amounts of these pixels are sampled, so as to obtain N different movement amounts, i.e., $mv_0$ to $mv_{N-1}$, through sampling. The pixel A is moved by these movement amounts to obtain new positions P+mv. FIG. 7b is a schematic structural diagram of another optional reference image according to an embodiment of the present disclosure. As illustrated in FIG. 7b, pixel values, $RV_0$ to $RV_{N-1}$, of the reference image at the new positions (positions B, C, D in the figure) are obtained. FIG. 7c is a schematic structural diagram of yet another optional reference image according to an embodiment of the present disclosure. As illustrated in FIG. 7c, a pixel value difference diff=|RV−BV| is calculated, and the N different movement amounts, $mv_0$ to $mv_{N-1}$, are weighted and summed based on the pixel value difference to obtain a new mv.

At block S305, position information, the movement amount, and the depth information are integrated and re-clustered to obtain a new image block.

With the above method, the depth information d, the movement amount $[mv_x, mv_y]$, and the position information [x, y] of all pixels are obtained. All the data are normalized, and each type of the data is multiplied by a weight w to re-obtain a high-dimensional array $[x*w_1, y*w_2, mv_x*w_3, mv_y*w_4, d*w_5]$. A clustering processing is performed in the high-dimensional array. A clustering method can be the mean-shift clustering algorithm, or a number of categories can also be specified in advance to perform clustering using the K-means clustering algorithm. FIG. 8a is a schematic structural diagram of optional image blocks of an image to be registered according to an embodiment of the present disclosure. FIG. 8b is a schematic structural diagram of optional clustered image blocks according to an embodiment of the present disclosure. As illustrated in FIG. 8a and FIG. 8b, pixels clustered into one category are redefined into a new image block (as illustrated in FIG. 8b). A threshold thresh2 is defined for respective clustered categories. When the number of pixels in a category is smaller than the thresh2, the category is discarded, and pixels in this category are reclassified to a category closest to the pixels.

At block S306, it is determined whether a convergence occurs or not; and when the convergence occurs, block S307 is executed; otherwise return to block S303.

The obtained new image blocks are compared with old image blocks to obtain the number of changed pixels by using a counter. First, the counter is reset to 0. For each pixel in an old image block, if the pixel does not belong to a new image block, the counter is incremented by 1. After all the pixels in the old image block are counted in this manner, the number m of changed pixels is obtained. Assuming that a size of the old image block is n, a ratio of changed pixels can be obtained as m/n, and a threshold thresh1 is set. When the ratio is smaller than the thresh1, it is determined that the algorithm has converged, the movement amounts of the pixels in the whole image are obtained, and S307 is executed; otherwise, the algorithm is continued. When it is determined the algorithm does not converge, search is performed again in the manner of S303 based on the obtained new image block.

At block S307, the image is re-registered to obtain a registered image.

Figure 9A:
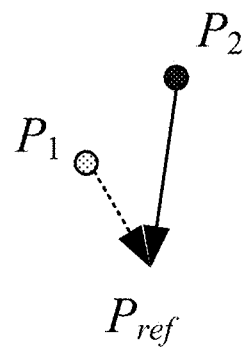
FIG. 9a is a schematic structural diagram of an optional overlapping pixel of a registered image according to an embodiment of the present disclosure.
Figure 9B:
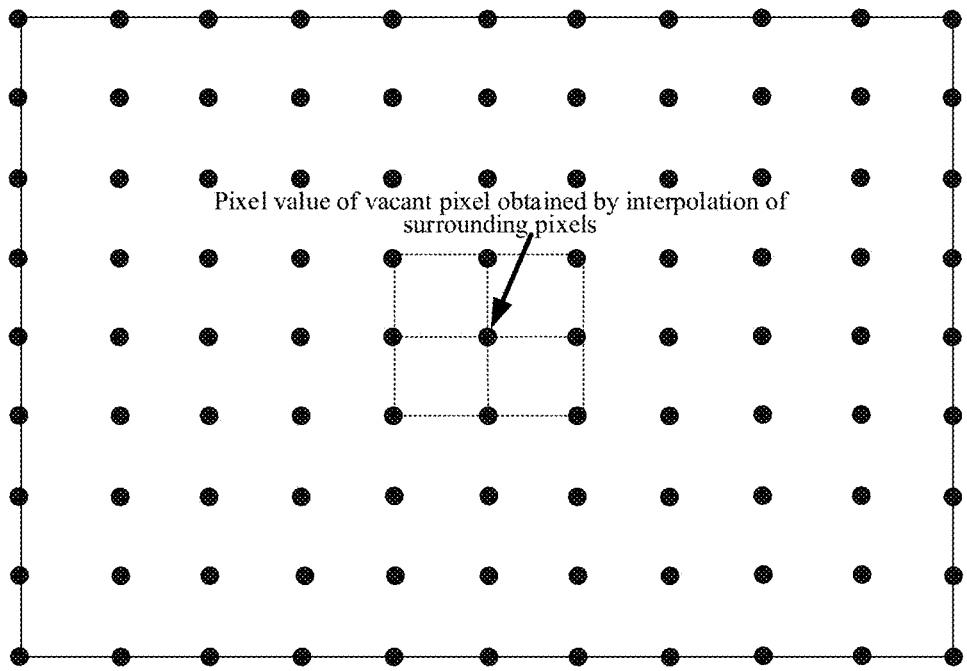
FIG. 9b is a schematic structural diagram of an optional vacant pixel of a registered image according to an embodiment of the present disclosure.

According to the above method, the movement amounts of all pixels are obtained. The pixels are moved based on the movement amounts of all the pixels to obtain the registered image. An overlap may appear in the moved image. FIG. 9a is a schematic structural diagram of an optional overlapping pixel of a registered image according to an embodiment of the present disclosure. As illustrated in FIG. 9a, more than two pixels have been moved to the same position. FIG. 9b is a schematic structural diagram of an optional vacant pixel of a registered image according to an embodiment of the present disclosure. As illustrated in FIG. 9b, the registered image includes a vacant hole, i.e., no pixels are moved to the vacant hole. In a case that overlapping occurs, as illustrated in FIG. 9a, for example, when two pixels respectively having pixel values P1 and P2 are moved to the same position, a pixel value $P_{ref}$ of the position in the reference image is obtained, and a pixel value difference is calculated. When $|P1-P_{ref}|<|P2-P_{ref}|$, a pixel value at this position of the registered image is set to be P1, otherwise, the pixel value is set to be P2. In a case where a vacant hole (equivalent to a vacant pixel) appears, an interpolation method can be used to fill the pixel, or the global motion model (e.g., an affine matrix or a homography matrix) can be calculated to calculate the pixel value of the vacant hole.

It can be seen from the above examples that, registration assisted with the depth information is more accurate than registration using only the image information. For a moving object, instead of adopting a model for prediction (it is hard to match a motion model of a local moving object with a single model), movements of individual pixels are calculated to register a moving object region with higher accuracy; and an irregular block search is more accurate for matching of an object having irregular edges.

That is, the embodiments of the present disclosure adopt a method similar to a dense optical flow estimation to present movement estimations of all pixels and re-register an image, without relying on a single motion model. In addition, depth information of a scene and block matching of irregular shapes are introduced in the search, thereby leading to good adaptability to complex motion scenes.

In the image registration method provided by the embodiments of the present disclosure, the first image and the second image are obtained; the first image is divided into blocks to obtain the image blocks of the first image; based on the pixel value of each of the image blocks of the first image, the similar image block of the image block of the first image is determined from the second image by invoking the predetermined image block similarity algorithm; based on the position information of the image block of the first image and position information of the similar image block of the image block of the first image, the movement amount of the image block of the first image is calculated; a clustering is performed on the first image based on the depth value of the first image, the movement amounts of the image blocks of the first image, and the position information of the first image, to generate the clustered image blocks; and when the clustered image blocks satisfy the predetermined condition, the image blocks of the first image are moved based on the movement amounts of the image blocks of the first image, to obtain the registered image. In other words, in the embodiments of the present disclosure, the movement amount of each of the image blocks of the first image is calculated based on the similar image block of the image block of the first image searched from in the second image, and then, the clustering is performed on the first image by using the depth value of the first image, the movement amounts of the image blocks of the first image, and the position information of the first image, to generate the clustered image blocks. In this manner, when the clustered image blocks satisfy the predetermined condition, the first image is moved based on the movement amounts of the image blocks of the first image, thereby obtaining the registered image. Consequently, in the image registration, the depth information of the first image is taken into account to form the clustered image blocks, and only when the clustered image blocks satisfy the predetermined condition, the image blocks of the first image can be moved based on the movement amounts of the image blocks of the first image to obtain the registered image, thereby improving the accuracy of the registered image, and presenting a better effect of the obtained registered image.

Embodiment 2

Figure 10:
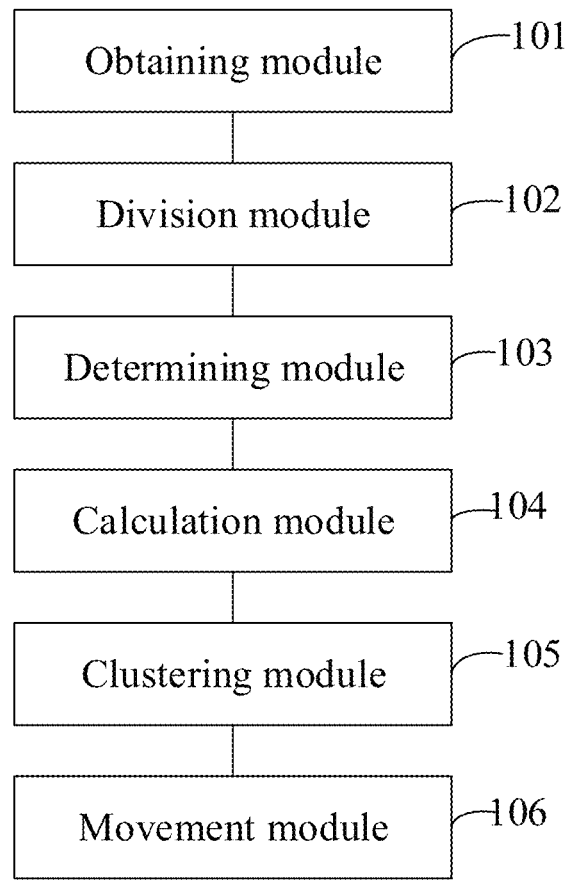
FIG. 10 is a first schematic structural diagram of an optional terminal according to an embodiment of the present disclosure.

Based on the same invention concept, the embodiments of the present disclosure provide a terminal. FIG. 10 is a first schematic structural diagram of an optional terminal according to an embodiment of the present disclosure. As illustrated in FIG. 10, the terminal may include an obtaining module 101, a division module 102, a determining module 103, a calculation module 104, a clustering module 105, and a movement module 106.

The obtaining module 101 is configured to obtain a first image and a second image.

The division module 102 is configured to divide the first image into blocks to obtain image blocks of the first image.

The determining module 103 is configured to determine, based on a pixel value of each of the image blocks of the first image, a similar image block of the image block of the first image from the second image by invoking a predetermined image block similarity algorithm.

The calculation module 104 is configured to calculate, based on position information of the image block of the first image and position information of the similar image block of the image block of the first image, a movement amount of the image block of the first image.

The clustering module 105 is configured to perform a clustering on the first image based on a depth value of the first image, the movement amounts of the image blocks of the first image, and position information of the first image, to generate clustered image blocks.

The movement module 106 is configured to move, when the clustered image blocks satisfy a predetermined condition, the image blocks of the first image based on the movement amounts of the image blocks of the first image to obtain a registered image.

In an alternative embodiment, the terminal is further configured to: determine, when the clustered image blocks fail to satisfy the predetermined condition, the clustered image blocks as image blocks of the first image to be updated; and return to determine, based on the pixel value of each of the image blocks of the first image, the similar image block of the image block of the first image from the second image by invoking the predetermined image block similarity algorithm.

In an alternative embodiment, when a resolution of a pixel value of the first image is different from a resolution of the depth value of the first image, the terminal is further configured to: prior to the clustering on the first image based on the depth value of the first image, the movement amounts of the image blocks of the first image, and the position information of the first image, to generate the clustered image blocks, increase, based on the resolution of the pixel value of the first image, the resolution of the depth value of the first image, to obtain a processed depth value of the first image. Correspondingly, the clustering module 105 is specifically configured to perform the clustering on the first image based on the processed depth value of the first image, the movement amounts of the image blocks of the first image, and the position information of the first image, to generate the clustered image blocks.

In an alternative embodiment, the calculation module 104 is specifically configured to: determine, as an initial movement amount of a pixel in the image block of the first image, a difference value between horizontal-vertical coordinates of the image block of the first image and horizontal-vertical coordinates of the similar image block of the image block of the first image; and correct the initial movement amount of the pixel in the image block of the first image to obtain the movement amount of the image block of the first image.

In an alternative embodiment, said correcting, by the calculation module 104, the initial movement amount of the pixel in the image block of the first image to obtain the movement amount of the image block of the first image includes: sampling a predetermined number of pixels from a predetermined range of the first image by taking position information of any selected pixel in the image block of the first image as a reference; moving, based on the initial movement amount of the predetermined number of pixels, the position information of the selected pixel to generate a moved pixel; obtaining, in the second image, a pixel value of a pixel at a same position as the moved pixel; determining a weight of the moved pixel based on the pixel value of the pixel at the same position as the moved pixel; and performing a weighted summation on an initial movement amount of the moved pixel based on the weight of the moved pixel, to obtain the movement amount of the image block of the first image.

In an alternative embodiment, said determining, by the calculation module 104, the weight of the moved pixel based on the pixel value of the pixel at the same position as the moved pixel includes: calculating an absolute difference between the pixel value of the pixel at the same position as the moved pixel and a pixel value of the selected pixel; and determining, as the weight of the moved pixel, a weight corresponding to the absolute difference between the pixel value of the pixel at the same position as the moved pixel and the pixel value of the selected pixel.

In an alternative embodiment, the clustering module 105 is specifically configured to: determine the movement amount of the image block of the first image as a movement amount of a pixel in the image block of the first image; multiply each of depth values corresponding to pixels in the first image, the movement amounts of the pixels in the first image, and position information of the pixels in the first image by a corresponding weight, to form arrays of the first image; and cluster the arrays of the first image based on a predetermined clustering algorithm to generate the clustered image blocks.

In an alternative embodiment, said clustering, by the clustering module 105, the arrays of the first image based on the predetermined clustering algorithm to generate the clustered image blocks includes: clustering the arrays of the first image based on the predetermined clustering algorithm to obtain initial clustered image blocks; selecting, from the initial clustered image blocks, an image block having a number of pixels smaller than a first predetermined threshold; and re-categorizing the selected image block to obtain the clustered image blocks In an alternative embodiment, said re-categorizing, by the clustering module 105, the selected image block to obtain the clustered image blocks includes: determining, from the initial clustered image blocks, an image block having a minimum distance to the selected image block; and categorizing the selected image block to a category of the image block having the minimum distance to the selected image, to obtain the clustered image blocks.

In an alternative embodiment, the clustered image blocks satisfying the predetermined condition is determined by: determining image blocks of the first image corresponding to the clustered image blocks in one-to-one correspondence, comparing each of the clustered image blocks with a corresponding one of the image blocks of the first image, and determining a number of changed pixels in the clustered image blocks; and determining, when a ratio of the number of the changed pixels to a size of the first image is smaller than a second predetermined threshold, that the clustered image blocks satisfy the predetermined condition.

In an alternative embodiment, the clustered image blocks failing to satisfy the predetermined condition is determined by: determining, when the ratio of the number of the changed pixels to the size of the first image is equal to or greater than the second predetermined threshold, that the clustered image blocks fail to satisfy the predetermined condition.

In an alternative embodiment, subsequent to said moving, when the clustered image blocks satisfy the predetermined condition, the image blocks of the first image based on the movement amounts of the image blocks of the first image to obtain the registered image, the terminal is further configured to: when there is an overlapping pixel in the registered image, select, from pixel values of the first image, one pixel value corresponding to the overlapping pixel, and determine the selected pixel value as a pixel value of the overlapping pixel.

In an alternative embodiment, said select, by the terminal, from the pixel values of the first image, the one pixel value corresponding to the overlapping pixel, and determining the selected pixel value as the pixel value of the overlapping pixel includes: obtaining at least two pixel values corresponding to the overlapping pixel; determining differences between the at least two pixel values and a pixel value of the second image corresponding to the overlapping pixel; and determining the pixel value of the overlapping pixel based on a relation of absolute values of the differences between the at least two pixel values and the pixel value of the second image corresponding to the overlapping pixel.

In an alternative embodiment, subsequent to moving, when the clustered image blocks satisfy the predetermined condition, the image blocks of the first image based on the movement amounts of the image blocks of the first image, to obtain the registered image, the terminal is further configured to: when there is a vacant pixel in the registered image, determine, based on a pixel value of an adjacent pixel of the vacant pixel, a pixel value of the vacant pixel by adopting a predetermined algorithm, in which the vacant pixel is a pixel having no pixel value.

In practical applications, the obtaining module 101, the division module 102, the determining module 103, the calculation module 104, the clustering module 105, and the movement module 106 may be implemented by a processor located on the terminal, specifically, by a Central Processing Unit (CPU), a Microprocessor Unit (MPU), a Digital Signal Processing (DSP), a Field Programmable Gate Array (FPGA), and the like.

Figure 11:
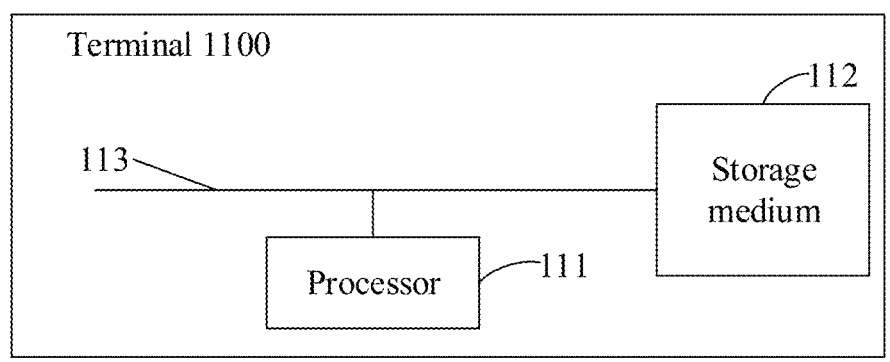
FIG. 11 is a second schematic structural diagram of an optional terminal according to an embodiment of the present disclosure.

FIG. 11 is a second schematic structural diagram of an optional terminal according to an embodiment of the present disclosure. As illustrated in FIG. 11, the embodiments of the present disclosure provide a terminal 1100. The terminal 1100 includes: a processor 111; and a storage medium 112 storing instructions executable by the processor 111. The storage medium 112 is operative by means of the processor 111, via a communication bus 113, and the instructions, when executed by the processor 111, implement the image registration method implemented by the above-mentioned image processor.

It should be noted that in practical application, various components in the terminal are coupled together via a communication bus 113. It can be understood that the communication bus 113 is configured to implement connection communication between these components. In addition to a data bus, the communication bus 113 further includes a power bus, a control bus, and a status signal bus. However, for the sake of clarity, various buses are labeled as the communication bus 113 in FIG. 11.

The embodiments of the present disclosure provide a computer storage medium having executable instructions stored thereon. One or more processors, when executing the executable instructions, implement the image registration method implemented by the terminal according to the above one or more embodiments.

It can be understood that the memory according to the embodiments of the present disclosure may be a volatile memory or a non-volatile memory, or the memory may include both a volatile memory and a non-volatile memory. The non-volatile memory can be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By way of exemplary rather than limiting description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The memory of the systems and methods described herein is intended to include, but not limited to, these and any other suitable types of memory.

The processor may be an integrated circuit chip having a signal processing capability. In an implementation process, action blocks of the above method embodiments can be completed by an integrated logic circuit of hardware in a processor or instructions in a form of software. The above processor can be a general-purpose processor, a Digital Signal Processor (DSP), an Application Specific Integrated Circuit (ASIC), a Field Programmable Gate Array (FPGA) or other programmable logic components, a discrete gate or a transistor logic component, and a discrete hardware component. The method, steps, and logical block diagrams disclosed according to an embodiment of the present disclosure can be implemented or executed. The general-purpose processor may be a microprocessor, or the processor may also be any conventional processor or the like. Steps of the method disclosed according to an embodiment of the present disclosure may be directly embodied as being executed and completed by a hardware decoding processor, or executed and completed by a combination of hardware and software modules in the decoding processor. A software module can be located in a mature storage medium in the field, such as a Random Access Memory (RAM), a flash memory, a Read-Only Memory (ROM), a Programmable ROM (PROM) or an electrically erasable programmable memory, and a register. The storage medium is located in a memory. The processor reads information in the memory, and completes steps of the above method in combination with hardware of the processor.

It can be understood that the embodiments described herein may be implemented by hardware, software, firmware, middleware, microcode, or a combination thereof. For a hardware implementation, a processing unit can be implemented in one or more Application Specific Integrated Circuits (ASIC), Digital Signal Processing (DSP), DSP Devices (DSPDs), Programmable Logic Devices (PLDs), Field-Programmable Gate Arrays (FPGAs), general purpose processors, controllers, microcontrollers, microprocessors, other electronic units configured to perform functions described in the present disclosure, or a combination thereof.

For a software implementation, techniques described in the present disclosure may be implemented through modules (e.g., procedures, functions, etc.) configured to perform the functions described herein. Software codes may be stored in the memory and executed by a processor. The memory can be implemented in the processor or external to the processor.

It should be noted that in the present disclosure, terms "include", "have", and any variations thereof are intended to cover non-exclusive inclusions, such that a process, method, product, or device that includes a series of elements is not necessarily limited to those clearly listed elements, but may also include other elements that are not clearly listed or are inherent to the process, method, product, or device. Without further limitation, an element defined by the phrase "comprising a . . . " does not preclude the presence of additional identical elements in the process, method, product, or device that includes the element.

The above-mentioned sequence numbers of the embodiments of the present application are for description only, and do not represent superiority or inferiority of the embodiments.

From the description of the above embodiments, those skilled in the art can clearly understand that the method according to the above embodiments can be implemented by means of software, together with a necessary general hardware platform, and of course can also be implemented by means of hardware, but in many cases the former means is a better implementation. Based on this understanding, all or part of the technical solutions according to the present disclosure, or the part thereof that contributes to the prior art, can be embodied in the form of a software product. The computer software product may be stored in a storage medium (e.g., an ROM/RAM, a magnetic disk, or an optical disc) and contain instructions to enable a terminal (e.g., a mobile phone, a computer, a server, or a network device, etc.) to perform the method described in each of the embodiments of the present disclosure.

The embodiments of the present disclosure are described above with reference to the accompanying drawings, but the present disclosure is not limited to the above specific implementations, which are merely illustrative, rather than restrictive. Under the motivation of the present disclosure, those skilled in the art can also make many variations without departing from the principles of the present disclosure and the protection scope of the claims as attached. These variations are to be encompassed by the protect scope of present disclosure.

INDUSTRIAL APPLICABILITY

Embodiments of the present disclosure provide an image registration method, a terminal, and a computer storage medium. The method includes: obtaining a first image and a second image; dividing the first image into blocks to obtain image blocks of the first image; determining, based on a pixel value of each of the image blocks of the first image, a similar image block of the image block of the first image from the second image by invoking a predetermined image block similarity algorithm; calculating, based on position information of the image block of the first image and position information of the similar image block of the image block of the first image, a movement amount of the image block of the first image; performing a clustering on the first image based on a depth value of the first image, the movement amounts of the image blocks of the first image, and position information of the first image, to generate clustered image blocks; and moving, when the clustered image blocks satisfy a predetermined condition, the image blocks of the first image based on the movement amounts of the image blocks of the first image, to obtain a registered image. In this way, the accuracy of the image registration can be improved.

What is claimed is:

1. An image registration method, comprising:
   obtaining image blocks of a first image by dividing the first image into blocks;
   determining, based on a pixel value of each of the image blocks of the first image, similar image blocks from a second image corresponding to the image blocks of the first image by invoking a predetermined image block similarity algorithm, each of the similar image blocks corresponding to one of the image blocks of the first image;
   obtaining, based on position information of the image block of the first image and position information of the corresponding similar image block, a movement amount of each of the image blocks of the first image;
   generating clustered image blocks by performing a clustering on the first image based on a depth value of the first image, the movement amounts of the image blocks of the first image, and position information of the first image; and
   obtaining, in response to the clustered image blocks satisfying a predetermined condition, a registered image by moving the image blocks of the first image based on the movement amounts of the image blocks of the first image;
   wherein the method further comprising:
      updating, in response to the clustered image blocks failing to satisfy the predetermined condition, the clustered image blocks as image blocks of the first image; and
      returning to operation of said determining, based on the pixel value of each of the image blocks of the first image, the similar image blocks from the second image corresponding to the image blocks of the first image by invoking the predetermined image block similarity algorithm; and
   wherein said obtaining, based on the position information of the image block of the first image and the position information of the corresponding similar image block, the movement amount of each of the image blocks of the first image comprises:
      determining a difference value between horizontal-vertical coordinates of the image block of the first image and horizontal-vertical coordinates of the similar image block of the image block of the first image, as an initial movement amount of a pixel in the image block of the first image; and
      correcting the initial movement amount of the pixel in the image block of the first image to obtain the movement amount of the image block of the first image, comprising:
         sampling a predetermined number of pixels from a predetermined range of the first image by taking position information of any selected pixel in the image block of the first image as a reference;
         moving, based on the initial movement amount of the predetermined number of pixels, the position information of the selected pixel to generate a moved pixel;
         obtaining, in the second image, a pixel value of a pixel at a same position as the moved pixel;
         determining a weight of the moved pixel based on the pixel value of the pixel at the same position as the moved pixel; and
         performing a weighted summation on an initial movement amount of the moved pixel based on the weight of the moved pixel, to obtain the movement amount of the image block of the first image.

2. The method according to claim 1, further comprising: in response to a resolution of a pixel value of the first image being different from a resolution of the depth value of the first image, and prior to said generating clustered image blocks by performing the clustering on the first image based on the depth value of the first image, the movement amounts of the image blocks of the first image, and the position information of the first image:
   increasing, based on the resolution of the pixel value of the first image, the resolution of the depth value of the first image, to obtain a processed depth value of the first image, and
   wherein said generating the clustered image blocks by performing the clustering on the first image based on the depth value of the first image, the movement amounts of the image blocks of the first image, and the position information of the first image comprises:
      generating the clustered image blocks by performing the clustering on the first image based on the processed depth value of the first image, the movement amounts of the image blocks of the first image, and the position information of the first image.

3. The method according to claim 1, wherein said determining the weight of the moved pixel based on the pixel value of the pixel at the same position as the moved pixel comprises:
   obtaining an absolute difference between the pixel value of the pixel at the same position as the moved pixel and a pixel value of the selected pixel; and determining, as the weight of the moved pixel, a weight corresponding to the absolute difference between the pixel value of the pixel at the same position as the moved pixel and the pixel value of the selected pixel.

4. The method according to claim 1, wherein said performing the clustering on the first image based on the depth value of the first image, the movement amounts of the image blocks of the first image, and the position information of the first image, to generate the clustered image blocks comprises:
determining the movement amount of the image block of the first image as a movement amount of a pixel in the image block of the first image;
multiplying each of depth values corresponding to pixels in the first image, the movement amounts of the pixels in the first image, and position information of the pixels in the first image by a corresponding weight, to form arrays of the first image; and
clustering the arrays of the first image based on a predetermined clustering algorithm to generate the clustered image blocks.

5. The method according to claim 4, wherein said clustering the arrays of the first image based on the predetermined clustering algorithm to generate the clustered image blocks comprises:
clustering the arrays of the first image based on the predetermined clustering algorithm to obtain initial clustered image blocks;
selecting, from the initial clustered image blocks, an image block having a number of pixels smaller than a first predetermined threshold; and
re-categorizing the selected image block to obtain the clustered image blocks.

6. The method according to claim 5, wherein said re-categorizing the selected image block to obtain the clustered image blocks comprises:
determining, from the initial clustered image blocks, an image block having a minimum distance to the selected image block; and
categorizing the selected image block to a category of the image block having the minimum distance to the selected image, to obtain the clustered image blocks.

7. The method according to claim 1, wherein the clustered image blocks satisfying the predetermined condition is determined by:
determining image blocks of the first image corresponding to the clustered image blocks in one-to-one correspondence, comparing each of the clustered image blocks with a corresponding one of the image blocks of the first image, and determining a number of changed pixels in the clustered image blocks; and
determining, in response to a ratio of the number of the changed pixels to a size of the first image being smaller than a second predetermined threshold, that the clustered image blocks satisfy the predetermined condition.

8. The method according to claim 7, wherein the clustered image blocks failing to satisfy the predetermined condition is determined by:
determining, in response to the ratio of the number of the changed pixels to the size of the first image being equal to or greater than the second predetermined threshold, that the clustered image blocks fail to satisfy the predetermined condition.

9. The method according to claim 1, further comprising:
after obtaining the registered image by moving the image blocks of the first image based on the movement amounts of the image blocks of the first image,
in response to an overlapping pixel in the registered image, selecting, from pixel values of the first image, one pixel value corresponding to the overlapping pixel, and determining the selected pixel value as a pixel value of the overlapping pixel.

10. The method according to claim 9, wherein said selecting, from the pixel values of the first image, the one pixel value corresponding to the overlapping pixel, and determining the selected pixel value as the pixel value of the overlapping pixel comprises:
obtaining at least two pixel values corresponding to the overlapping pixel;
determining differences between the at least two pixel values and a pixel value of the second image corresponding to the overlapping pixel; and
determining the pixel value of the overlapping pixel based on a relation of absolute values of the differences between the at least two pixel values and the pixel value of the second image corresponding to the overlapping pixel.

11. The method according to claim 1, further comprising:
after obtaining the registered image by moving the image blocks of the first image based on the movement amounts of the image blocks of the first image,
in response to a vacant pixel in the registered image, determining, based on a pixel value of an adjacent pixel of the vacant pixel, a pixel value of the vacant pixel by adopting a predetermined algorithm, wherein the vacant pixel is a pixel having no pixel value.

12. A terminal, comprising:
a processor; and
a storage medium storing instructions executable by the processor,
wherein the storage medium is operative by means of the processor, via a communication bus, and the instructions, when executed by the processor, implement an image registration method comprising:
obtaining image blocks of a first image by dividing the first image into blocks;
determining, based on a pixel value of each of the image blocks of the first image, similar image blocks from a second image corresponding to the image blocks of the first image by invoking a predetermined image block similarity algorithm, each of the similar image blocks corresponding to one of the image blocks of the first image;
obtaining, based on position information of the image block of the first image and position information of the corresponding similar image block, a movement amount of each of the image blocks of the first image;
generating clustered image blocks by performing a clustering on the first image based on a depth value of the first image, the movement amounts of the image blocks of the first image, and position information of the first image; and
obtaining, in response to the clustered image blocks satisfying a predetermined condition, a registered image by moving the image blocks of the first image based on the movement amounts of the image blocks of the first image;
wherein the clustered image blocks satisfying the predetermined condition is determined by:
determining image blocks of the first image corresponding to the clustered image blocks in one-to-one correspondence, comparing each of the clustered image blocks with a corresponding one of the image blocks of the first image, and determining a number of changed pixels in the clustered image blocks; and determining, in response to a ratio of the number of the changed pixels to a size of the first image being smaller than a second predetermined threshold, that the clustered image blocks satisfy the predetermined condition.

13. The terminal according to claim 12, wherein the image registration method further comprises:

updating, in response to the clustered image blocks failing to satisfy the predetermined condition, the clustered image blocks as image blocks of the first image; and returning to operation of said determining, based on the pixel value of each of the image blocks of the first image, the similar image blocks from the second image corresponding to the image blocks of the first image by invoking the predetermined image block similarity algorithm.

14. The terminal according to claim 12, wherein the image registration method further comprises: in response to a resolution of a pixel value of the first image being different from a resolution of the depth value of the first image, and prior to said generating clustered image blocks by performing the clustering on the first image based on the depth value of the first image, the movement amounts of the image blocks of the first image, and the position information of the first image:

increasing, based on the resolution of the pixel value of the first image, the resolution of the depth value of the first image, to obtain a processed depth value of the first image, and wherein said generating the clustered image blocks by performing the clustering on the first image based on the depth value of the first image, the movement amounts of the image blocks of the first image, and the position information of the first image comprises:

generating the clustered image blocks by performing the clustering on the first image based on the processed depth value of the first image, the movement amounts of the image blocks of the first image, and the position information of the first image.

15. A non-transitory computer-readable storage medium having executable instructions stored thereon, wherein one or more processors, when executing the executable instructions, implement an image registration method comprising:

obtaining image blocks of a first image by dividing the first image into blocks;

determining, based on a pixel value of each of the image blocks of the first image, similar image blocks from a second image corresponding to the image blocks of the first image by invoking a predetermined image block similarity algorithm, each of the similar image blocks corresponding to one of the image blocks of the first image;

obtaining, based on position information of the image block of the first image and position information of the corresponding similar image block, a movement amount of each of the image blocks of the first image;

generating clustered image blocks by performing a clustering on the first image based on a depth value of the first image, the movement amounts of the image blocks of the first image, and position information of the first image; and obtaining, in response to the clustered image blocks satisfying a predetermined condition, a registered image by moving the image blocks of the first image based on the movement amounts of the image blocks of the first image;

updating, in response to the clustered image blocks failing to satisfy the predetermined condition, the clustered image blocks as image blocks of the first image;

returning to operation of said determining, based on the pixel value of each of the image blocks of the first image, the similar image blocks from the second image corresponding to the image blocks of the first image by invoking the predetermined image block similarity algorithm, wherein after obtaining the registered image by moving the image blocks of the first image based on the movement amounts of the image blocks of the first image, the method further comprises:

in response to an overlapping pixel being in the registered image, selecting, from pixel values of the first image, one pixel value corresponding to the overlapping pixel, and determining the selected pixel value as a pixel value of the overlapping pixel, comprising:

obtaining at least two pixel values corresponding to the overlapping pixel;

determining differences between the at least two pixel values and a pixel value of the second image corresponding to the overlapping pixel; and determining the pixel value of the overlapping pixel based on a relation of absolute values of the differences between the at least two pixel values and the pixel value of the second image corresponding to the overlapping pixel.

16. The terminal according to claim 12, wherein said obtaining, based on the position information of the image block of the first image and the position information of the corresponding similar image block, the movement amount of each of the image blocks of the first image comprises:

determining a difference value between horizontal-vertical coordinates of the image block of the first image and horizontal-vertical coordinates of the similar image block of the image block of the first image, as an initial movement amount of a pixel in the image block of the first image; and correcting the initial movement amount of the pixel in the image block of the first image to obtain the movement amount of the image block of the first image, comprising:

sampling a predetermined number of pixels from a predetermined range of the first image by taking position information of any selected pixel in the image block of the first image as a reference;

moving, based on the initial movement amount of the predetermined number of pixels, the position information of the selected pixel to generate a moved pixel;

obtaining, in the second image, a pixel value of a pixel at a same position as the moved pixel;

determining a weight of the moved pixel based on the pixel value of the pixel at the same position as the moved pixel; and performing a weighted summation on an initial movement amount of the moved pixel based on the weight of the moved pixel, to obtain the movement amount of the image block of the first image.

17. The terminal according to claim 12, wherein after obtaining the registered image by moving the image blocks of the first image based on the movement amounts of the image blocks of the first image, the image registration method further comprises:

in response to an overlapping pixel in the registered image, selecting, from pixel values of the first image, one pixel value corresponding to the overlapping pixel, and determining the selected pixel value as a pixel value of the overlapping pixel.

\* \* \* \* \*